United States Patent
Ligander et al.

(10) Patent No.: US 11,495,882 B2
(45) Date of Patent: Nov. 8, 2022

(54) ALIGNMENT MEANS FOR DIRECTIVE ANTENNAS

(71) Applicant: Telefonaktiebolaget LM Ericsson (publ), Stockholm (SE)

(72) Inventors: Per Ligander, Gothenburg (SE); Karl-Axel Lind, Mölndal (SE); Jan Sandberg, Frillesås (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 151 days.

(21) Appl. No.: 16/960,936

(22) PCT Filed: Feb. 8, 2018

(86) PCT No.: PCT/EP2018/053225
§ 371 (c)(1),
(2) Date: Jul. 9, 2020

(87) PCT Pub. No.: WO2019/154503
PCT Pub. Date: Aug. 15, 2019

(65) Prior Publication Data
US 2020/0350673 A1 Nov. 5, 2020

(51) Int. Cl.
*H01Q 3/06* (2006.01)
*H01Q 1/24* (2006.01)
(Continued)

(52) U.S. Cl.
CPC ............ *H01Q 3/06* (2013.01); *H01Q 1/24* (2013.01); *H01Q 1/246* (2013.01); *H04B 17/12* (2015.01); *H04B 17/15* (2015.01); *H04B 17/18* (2015.01)

(58) Field of Classification Search
CPC . H01Q 3/06; H01Q 1/246; H01Q 1/24; H04B 17/18; H04B 17/12; H04B 17/15
(Continued)

(56) References Cited

U.S. PATENT DOCUMENTS 9,590,298 B1 3/2017 Buchmueller et al.
2016/0269917 A1 9/2016 Hillegas, Jr. et al.
(Continued)

FOREIGN PATENT DOCUMENTS

JP 2017071395 A 4/2017
WO 2017063695 A1 4/2017

OTHER PUBLICATIONS

FrSky, "FrSky 2.4GHz ACCST Taranis X9D Digital Telemetry Radio System User Guide", Apr. 7, 2013, pp. 1-24, FrSky.
(Continued)

*Primary Examiner* — Hai V Tran
(74) *Attorney, Agent, or Firm* — Coats & Bennett, PLLC

(57) ABSTRACT

The present disclosure relates to an un-manned aerial vehicle (200) for aligning a first directive antenna (101) in a direction D1 towards a second antenna (102), comprising a docking interface (210) arranged to attach the aerial vehicle (200) to a first alignment device (110) of the first directive antenna (101) and an alignment actuator (220) arranged to mechanically interface with the alignment device (110) and to actuate alignment of the first directive antenna (101) based on an alignment control signal. The aerial vehicle further comprises a control unit (230) configured to generate an alignment control signal.

20 Claims, 5 Drawing Sheets

(51) Int. Cl.
*H04B 17/12* (2015.01)
*H04B 17/18* (2015.01)
*H04B 17/15* (2015.01)

(58) Field of Classification Search
USPC .......................................................... 343/702
See application file for complete search history.

(56) References Cited

U.S. PATENT DOCUMENTS

2016/0309337 A1* 10/2016 Priest .................... H04W 24/02
2017/0155456 A1* 6/2017 Wennerlöf ............. G01R 29/10
2017/0366751 A1 12/2017 Terry et al.
2018/0277939 A1* 9/2018 Peitzer .................... H01Q 1/28

OTHER PUBLICATIONS

Fat Shark, "Fat Shark RC Vision Systems: Predator V2 RTF FPV Kit User Manual", Revision C, Sep. 9, 2013, pp. 1-12, Fat Shark.

* cited by examiner

ALIGNMENT MEANS FOR DIRECTIVE ANTENNAS

TECHNICAL FIELD

The present disclosure relates to an un-manned aerial vehicle for aligning a first directive antenna in a direction towards a second antenna.

BACKGROUND

Microwave link communication is performed between microwave link nodes positioned at different sites, where two microwave link nodes that are adapted to communicate with each other constitute a microwave link hop. A microwave link node typically comprises a mast onto which a microwave radio transceiver and a link antenna are mounted.

Alignment of a microwave link hop between two sites is normally based on manual work. According to regulations, at least two persons should be located at each site, one person climbing the mast while the other person is remaining at the ground. The person that climbs the masts at each site has to carry antenna mount equipment including a mast bracket, the link antenna, the microwave radio transceiver and several tools. The link antenna with the antenna mount is assembled on the mast; a rough alignment is done before the bracket is fixed. The microwave radio transceiver is assembled onto and connected to the link antenna, and is then turned on.

A final alignment is done by one person at each mast by means of adjustment screws located in different positions on the antenna mount. When best Received Signal Strength Indication (RSSI) is found on each site, the persons in the masts tighten a number of locking screws and nuts on the respective antenna mount, and then the deployment is finished.

The deployment needs at least two installers at each site, where one is located in the mast at a certain height. The antenna mount has screws located at different positions on the antenna mount, and also includes a plurality of washers, lock nuts, etc. where all screws and nuts have to be adjusted with hand tools. This leads to that the adjustments that leads to a suitable alignment is time-consuming and sometimes inaccurate.

SUMMARY

It is an object of the present disclosure to provide enhanced means for alignment of a microwave link.

Said object is obtained by means of an un-manned aerial vehicle for aligning a first directive antenna in a direction towards a second antenna. The aerial device comprises a docking interface arranged to attach the aerial vehicle to a first alignment device of the first directive antenna, an alignment actuator arranged to mechanically interface with the alignment device and to actuate alignment of the first directive antenna based on an alignment control signal, and a control unit configured to generate the alignment control signal.

This confers an advantage of only needing one installation team instead of two since only one site at a time, where no persons need to climb a mast for performing alignment.

According to some aspects, the aerial vehicle is arranged as a remote controlled un-manned aerial vehicle where the control unit comprises a communications module arranged to receive control commands from a remote transceiver.

This confers an advantage of enabling one person is enabled to perform the alignment from the ground, which of course reduces time for alignment.

According to some aspects, the aerial vehicle is configured at least in part for autonomous operation, where the control unit is configured to autonomously generate control commands for controlling the aerial vehicle.

This confers an advantage of facilitating control of the aerial vehicle.

According to some aspects, the docking interface comprises a releasable connector. For example, the docking interface comprises a controllable magnetic device configured to be activated in a docking mode of operation, and to be inactivated in a non-docking mode of operation. Alternatively, the docking interface comprises an extendable member arranged to be received by the alignment device, and to be releasably locked in position during a docking mode of operation.

This confers an advantage of uncomplicated docking and release of docking.

According to some aspects, the alignment actuator comprises a first member arranged to mechanically interface with a first alignment interface of the alignment device. Upon actuation, the first alignment interface is arranged to control alignment of the directive antenna in a first direction.

According to some aspects, the alignment actuator comprises a second member arranged to mechanically interface with a second alignment interface of the alignment device. Upon actuation, the second alignment interface is arranged to control alignment of the directive antenna in a second direction, different from the first direction.

This confers an advantage of enabling versatile alignment.

According to some aspects, each member is connected to a respective motor that is adapted to rotate a corresponding member when mechanically interfaced with a corresponding alignment interface.

According to some aspects, each alignment interface is rotatable by means of a corresponding mechanically interfaced member, Rotation of each alignment interface controls alignment of the directive antenna in a direction.

This confers an advantage of enabling an easily performed and controlled alignment.

According to some aspects, the control unit is arranged to obtain an indicator signal configured to indicate a level of alignment of the first directive antenna with respect to the second antenna, and to generate the control signal based on the indicator signal.

For example, the indicator signal comprises a received signal strength indication (RSSI) value and/or an external control signal obtained from a remote source.

This confers an advantage of enabling accuracy of the alignment procedure and result.

According to some aspects, the second antenna is a directive antenna, where the control unit comprises a communications module configured to establish communication with a further un-manned aerial vehicle arranged to align the second directive antenna in a direction towards the first directive antenna.

This confers an advantage of enabling simultaneous alignment of both directional antennas, dispensing the need for visiting both sites.

According to some aspects, the aerial vehicle comprises a camera unit arranged to capture one or more images, wherein the control unit comprises a communications module configured to transmit the one or more images to a remote transceiver.

This confers an advantage of providing means for facilitating navigation of the aerial vehicle.

There are also disclosed herein methods, communication systems, wireless devices computer programs and computer program products associated with the above-mentioned advantages.

BRIEF DESCRIPTION OF THE DRAWINGS

The present disclosure will now be described more in detail with reference to the appended drawings, where.

DETAILED DESCRIPTION

Figure 1:
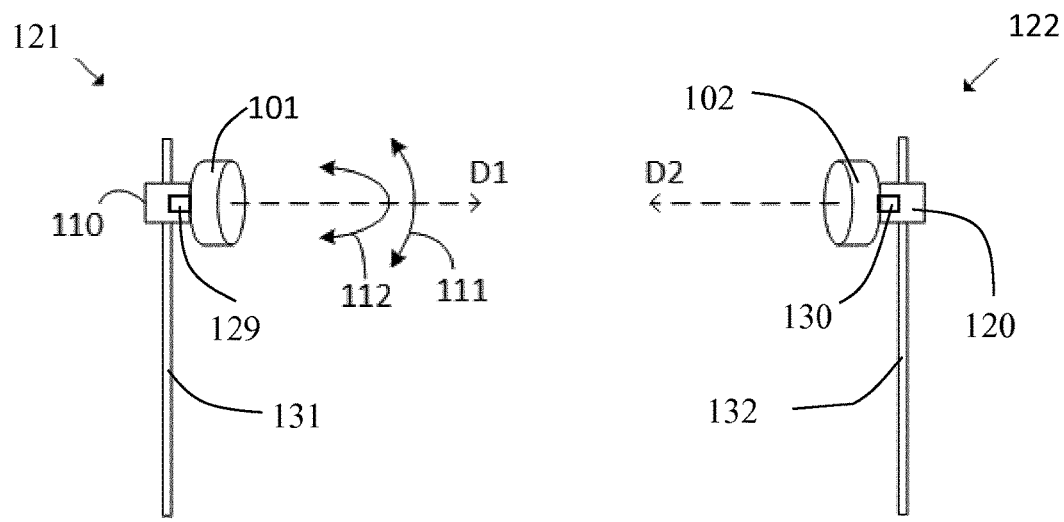
FIG. 1 schematically shows two microwave link nodes.

With reference to FIG. 1, there is a first microwave link node 121 and a second microwave link node 122. The first microwave link node 121 comprises a first directive antenna 101, a first microwave radio transceiver 129 that is attached to the first directive antenna 101, and a first alignment device 110 that also is attached to the first directive antenna 101. The first microwave link node 121 also comprises a first mast 131 onto which the first alignment device 110 is attached.

Correspondingly, the second microwave link node 122 comprises a second directive antenna 102, a second microwave radio transceiver 130 that is attached to the second directive antenna 102, and a second alignment device 120 that also is attached to the second directive antenna 102. The second microwave link node 122 also comprises a second mast 132 onto which the second alignment device 120 is attached.

Figure 5:
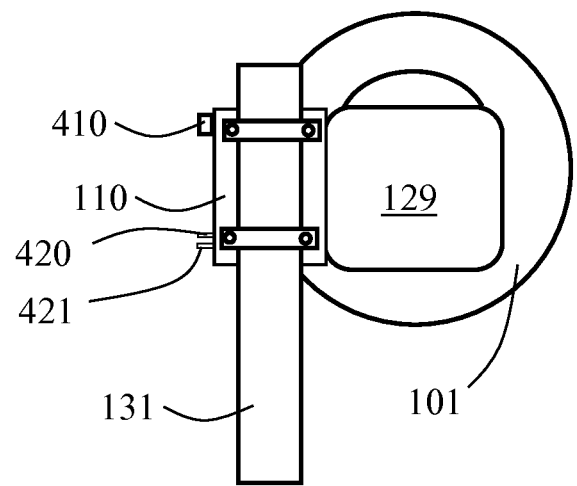
FIG. 5 schematically shows a back view of a microwave link node.

As shown for the first microwave link node 121 in FIG. 5, still with reference also to FIG. 1, the first alignment device 110 comprises an azimuth adjustment screw 420 and an elevation adjustment screw 421, which adjustment screw 420, 421 are arranged relatively close to each other on the same side of the first alignment device 110. The azimuth adjustment screw 420 is adapted to adjust the first alignment device 110 in an azimuth direction 112 and the elevation adjustment screw 421 is adapted to adjust the first alignment device 110 in an elevation direction 111. Rotation of the adjustment screws 420, 421 thus controls alignment of the first directive antenna 101 in certain directions.

The respective adjustments are performed by rotation of a corresponding adjustment screw 420, 421, preferably only one tool type is needed for executing such rotation, according to some aspects a screwdriver device. According to some aspects, the adjustment screws 420, 421 are connected to a respective worm gear or similar for effectuating a physical displacement, such that a self-locking functionality is obtained. This provides an accurate alignment.

Figure 2:
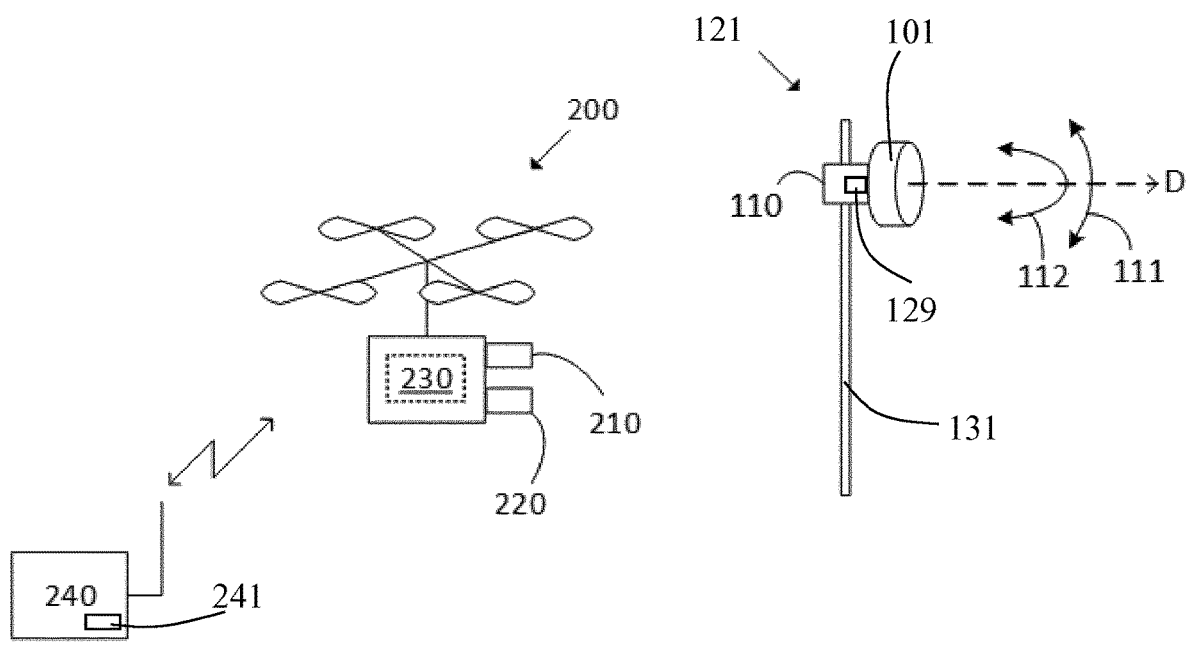
FIG. 2 schematically shows first view of an aerial vehicle and a microwave link node.
Figure 4:
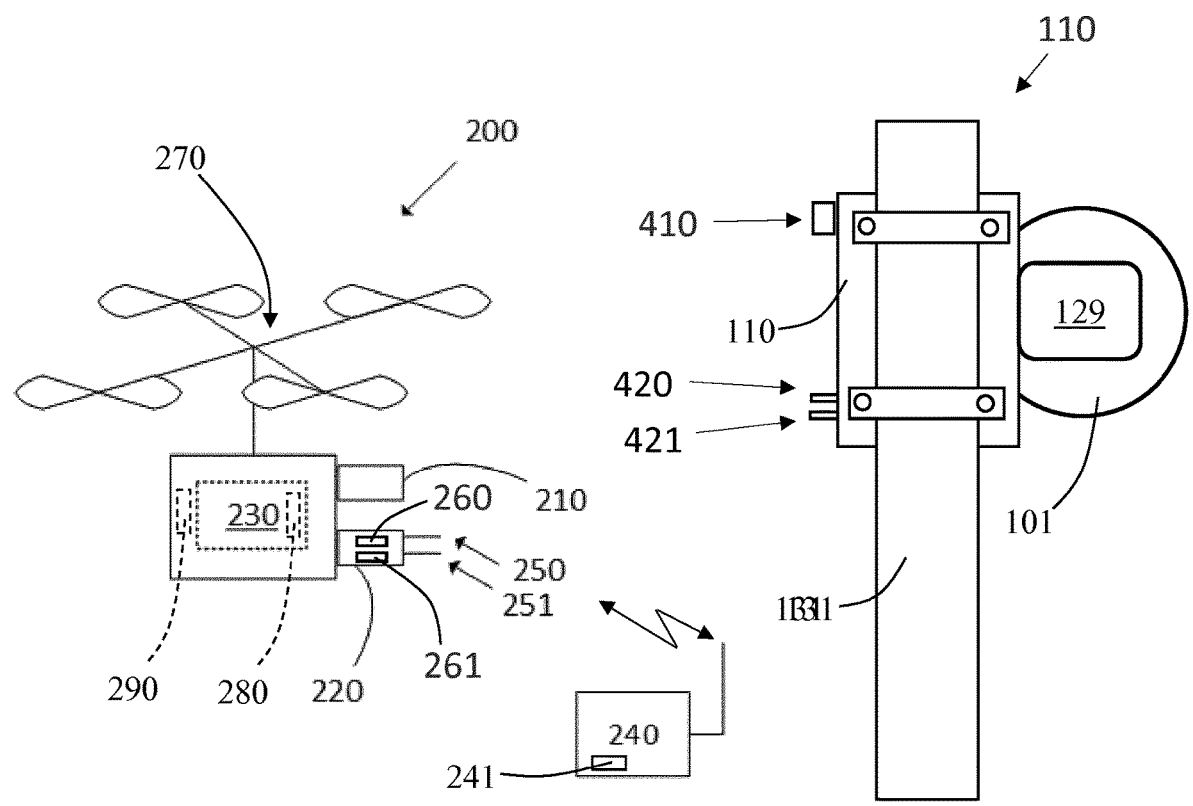
FIG. 4 schematically shows second view of an aerial vehicle and a microwave link node.

With reference also to FIG. 2 and FIG. 4, the present disclosure relates to an unmanned aerial vehicle 200 such as a remotely controlled drone that is adapted for aligning the first directive antenna 101 in a direction D1 towards the second directive antenna 102. The aerial vehicle 200 comprises a docking interface 210 arranged to attach the aerial vehicle 200 to the first alignment device 110 and an alignment actuator 220 arranged to mechanically interface with the alignment device 110 and to actuate alignment of the first directive antenna 101 based on an alignment control signal. The aerial vehicle 200 also comprises a control unit 230 configured to generate the alignment control signal, as well as a propulsion arrangement 270, here shown as a propeller arrangement 270.

The docking interface 210 comprises a releasable connector, according to some aspects in the form of a controllable magnetic device configured to be activated in a docking mode of operation, and to be inactivated in a non-docking mode of operation. In the docking mode of operation, the docking interface 210 is adapted to attach to a docking port 410 comprised in the first alignment device 110.

By means of the present disclosure, only two persons are needed for setting up a link hop, where one person climbs the corresponding masts 131, 132 for mounting the corresponding directive antenna 101, 102 with the microwave radio transceiver 129, and the alignment device 110, 120 while the other person stays on the ground. For each mast 131, 132, a rough alignment is made for the corresponding directive antenna 101, 102 by adjusting the corresponding alignment device 110, 120. Then the corresponding microwave radio transceiver 129, 130 is started. Now the link nodes 121, 122 are ready for a more accurate alignment, which in accordance with the present disclosure is performed by means of the aerial vehicle 200. In the following, an example of this will be described for the first link node 121.

Figure 3:
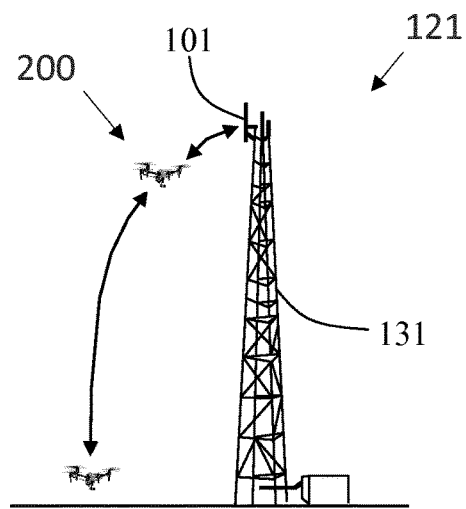
FIG. 3 schematically shows an aerial vehicle travelling to a microwave link node.
Figure 6:
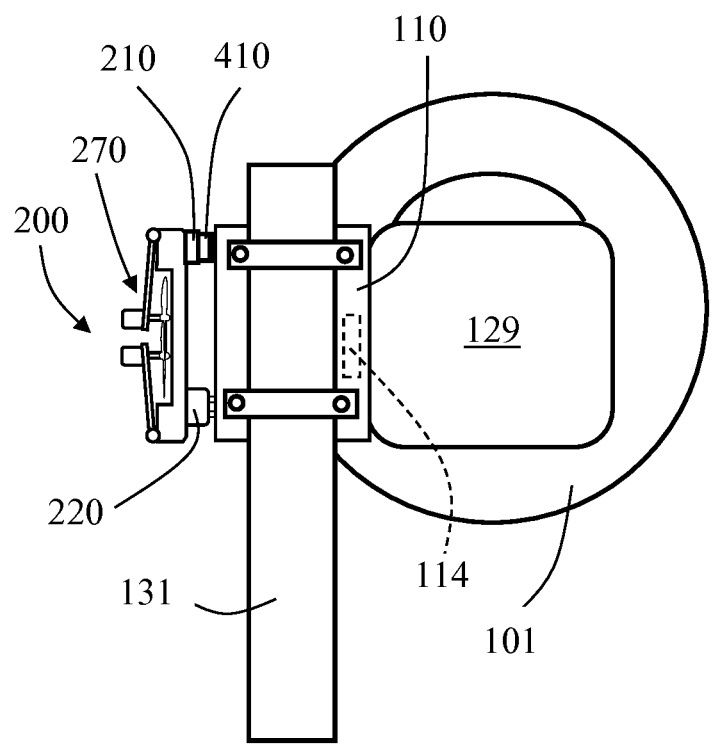
FIG. 6 schematically shows a back view of a microwave link node with a docked aerial vehicle.
Figure 7:
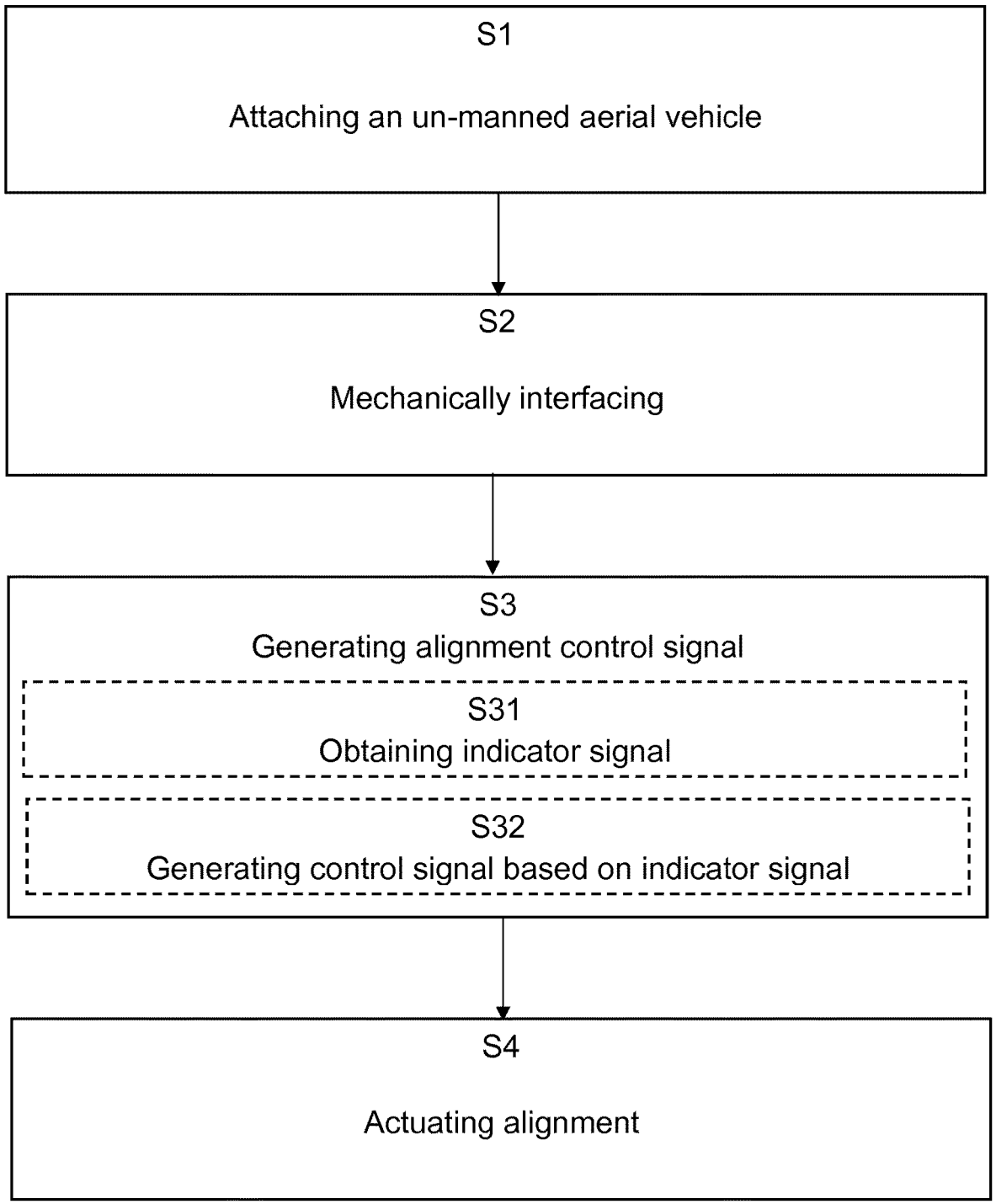
FIG. 7 shows a method according to the present disclosure.

In FIG. 3, it is shown how the aerial vehicle 200 lifts of and attaches itself to the first directive antenna 101, as shown in more detail in FIG. 6 where the docking interface 210 is attached to the docking port 410 and the propeller arrangement 270 is folded in. The docking can be performed at the first link node 121 before the persons working with the installation travels to the second link node 122 for mounting the equipment in the second mast 132. In this example, the aerial vehicle 200 is arranged as a remote controlled unmanned aerial vehicle, wherein the control unit 230 comprises a communications module 280 arranged to communicate with a remote transceiver 240 handled by a person, as indicated in FIG. 2 and FIG. 4. This communication comprises the communications module 280 receiving control commands from the remote transceiver 240. The aerial vehicle can be adapted only for remote control by means of the remote transceiver 240, and according to some aspects to be adapted for more or less automatic control. For example, when the aerial vehicle 200 is close to the first directive antenna 101, a radio module 114 comprised in the first alignment device 110 takes over piloting of the aerial vehicle 200, such that a proper docking is obtained automatically.

The alignment actuator 220 comprises a first member 250 arranged to mechanically interface with the azimuth adjustment screw 420 and a second member 251 that is arranged to mechanically interface with the elevation adjustment screw 421. The members 250, 251 comprise screwdriver bits that are adapted to fit into the adjustment screw 420, 421, and each member 250, 251 is connected to a respective electric motor 260, 261 that is adapted to rotate the corresponding member 250, 251 when mechanically interfaced with a corresponding adjustment screw 420, 421. By controlling the electric motors 260, 261 of the members 250, 251 it is thus possible to perform alignment without having to be present in the mast 131.

In order to perform a correct alignment, it is necessary to obtain a measure of signal strength, which measure normally is maximized. According to some aspects, the control unit 230 is for this purpose arranged to obtain an indicator signal configured to indicate a level of alignment of the first directive antenna 101 with respect to the second directive antenna 102, and to generate the control signal based on the indicator signal. The indicator signal comprises a received signal strength indication (RSSI) value, that is an external control signal obtained from a remote source. For this purpose, according to some aspects, the radio module 114 is adapted to communicate with corresponding equipment at the second alignment device 120 during the alignment procedure to meet the best predicted RSSI value. Bluetooth and/or Wi-Fi communication or GSM, 3G, 4G or 5G are a number of wireless formats for communicating RSSI. The person performing the alignment can then control the members 250, 251 while at the same time being informed of the present RSSI value.

According to some aspects, the first microwave radio transceiver 129 is adapted to provide an RSSI signal that is communicated to the control unit 230 via the radio module 114 wirelessly, for example according to the above wireless formats.

According to some aspects, the docking port 410 comprises a signal connection such that a wired communication is established between the control unit 230 and the first microwave radio transceiver 129 and/or the first alignment device 110.

The alignment procedure is performed at both link nodes 121, 122 until a satisfactory alignment result is obtained. Only one person is needed for performing the alignment procedure, and requires only the skills of maneuvering the aerial vehicle 200 and the members 250, 251 in dependence of the present RSSI value. The alignment procedure can of course be more or less automated, such that a person performing an alignment only needs to see to that the aerial vehicle 200 is properly docked, where a docking procedure also can be automated as indicated above.

It is even conceivable that a vehicle can be sent out on GPS (Global positioning system) coordinates or the like for a certain link node 121, 122, automatically dock and automatically perform alignment.

In these cases, the aerial vehicle 200 is configured at least in part for autonomous operation, wherein the control unit 230 is configured to autonomously generate control commands for controlling the aerial vehicle 200. When completely automatically operated, the aerial vehicle is according to some aspects not remote controlled.

According to some aspects, the aerial vehicle 200 comprises a camera 290 unit arranged to capture one or more images, where the communications module 280 is configured to transmit the one or more images to a remote transceiver 240. The images can according to some aspects be used for navigation of the aerial vehicle 200.

According to some aspects, a further vehicle, of the same type as the aerial vehicle 200 described above, can be used at each link node 121, 122. This enables a more efficient alignment, since both directive antennas 201, 202 are aligned simultaneously. In this case, the communications module 280 is configured to establish communication with the further un-manned aerial vehicle arranged to align the second directive antenna 102 in a direction D2 towards the first directive antenna 101. Both these two vehicles are according to some aspects more or less configured at least in part for autonomous operation as exemplified above.

The aerial vehicle according to the present disclosure can of course be used at an existing installation, for example if a decrease link performance has been indicated. The aerial vehicle can then be used to enhance the alignment.

The communications module 280 is according to some aspects configured to establish communication with both alignment devices 110, 120.

Generally, the adjustment screws 420, 421 are constituted by alignment interfaces 420, 421 where each alignment interface 420, 421 is rotatable by means of a corresponding mechanically interfaced member (250, 251), where rotation of each alignment interface 420, 421 controls alignment of the directive antenna 101 in a direction.

There is at least one alignment interface 420, 421, and the alignment actuator 220 comprises a first member 250 arranged to mechanically interface with a first alignment interface 420 of the alignment device 110. Upon actuation, the first alignment interface 420 is arranged to control alignment of the directive antenna 101 in a first direction.

According to some aspects, the alignment actuator 220 comprises a second member 251 arranged to mechanically interface with a second alignment interface 421 of the alignment device 110. Upon actuation, the second alignment interface is arranged to control alignment of the directive antenna 101 in a second direction different from the first direction.

According to some aspects each alignment interface 420, 421 is rotatable by means of a corresponding mechanically interfaced member 250, 251, where rotation of each alignment interface 420, 421 controls alignment of the directive antenna 101 in a direction. In the examples above, an azimuth direction 112 and an elevation direction 111 are disclosed, but other directions, fewer directions, or more directions are conceivable.

The present disclosure is not limited to the example described above, but may vary within the scope of the appended claims. For example, instead of, or as an addition to, the previously described controllable magnetic device, the docking interface 210 comprises an extendable member arranged to be received by the alignment device 110, and to be releasably locked in position during a docking mode of operation.

According to some aspects, each alignment device 110, 120 comprises a self-locking function that is adapted to normally lock the adjustment screws 420, 421. During the alignment process, the self-locking function is adapted to unlock the adjustment screws 420, 421.

Figure 8:
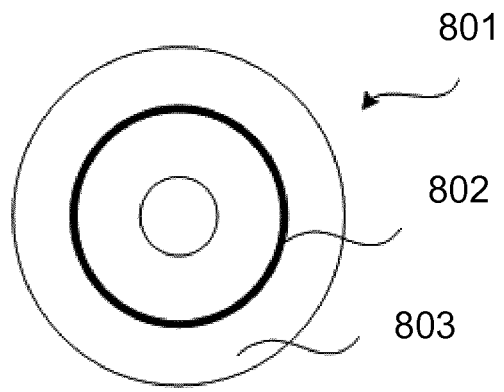
FIG. 8 shows one example of a computer program product comprising a computer readable storage medium.

FIG. 8 shows one example of a computer program product 801 comprising a computer program 802 for aligning a first directive antenna 101 in a direction D1 towards a second antenna 102. The computer program 802 comprises computer code stored on a computer readable storage medium 803.

Figure 9:
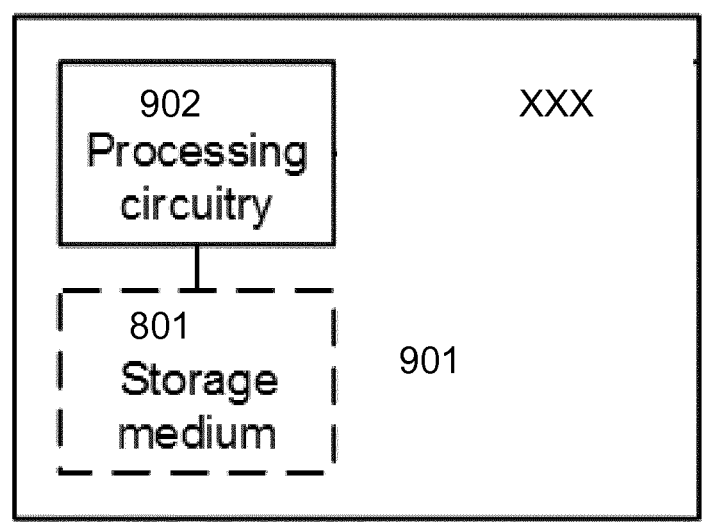
FIG. 9 shows one example of a network node comprising a computer readable storage medium.

FIG. 9 is a schematic diagram showing a network node 901 comprising the storage medium 801 and processing circuitry 902 adapted for running said computer program. When run on the processing circuitry 902 of the network node 901, the computer program causes the network node 901 to:

attach an un-manned aerial vehicle 200 to a first alignment device 110 of the first directive antenna 101, mechanically interface an alignment actuator 220, used in the aerial vehicle 200, with the alignment device 110, generate an alignment control signal, and actuate alignment of the first directive antenna 101 based on the alignment control signal.

In the example of FIG. 8, the computer program product 801 is illustrated as an optical disc, such as a CD (compact disc) or a DVD (digital versatile disc) or a Blu-Ray disc. The computer program product 801 could also be embodied as a memory, such as a random-access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 802 is here schematically shown as a track on the depicted optical disk, the computer program 802 can be stored in any way which is suitable for the computer program product 801.

Generally, the present disclosure relates to an un-manned aerial vehicle 200 for aligning a first directive antenna 101 in a direction D1 towards a second antenna 102, the aerial device 200 comprising:

a docking interface 210 arranged to attach the aerial vehicle 200 to a first alignment device 110 of the first directive antenna 101, an alignment actuator 220 arranged to mechanically interface with the alignment device 110 and to actuate alignment of the first directive antenna 101 based on an alignment control signal, and a control unit 230 configured to generate the alignment control signal.

According to some aspects, the aerial vehicle is arranged as a remote controlled un-manned aerial vehicle 200, wherein the control unit 230 comprises a communications module 280 arranged to receive control commands from a remote transceiver 240.

According to some aspects, the aerial vehicle 200 is configured at least in part for autonomous operation, wherein the control unit 230 is configured to autonomously generate control commands for controlling the aerial vehicle 200.

According to some aspects, the docking interface 210 comprises a releasable connector.

According to some aspects, the docking interface 210 comprises a controllable magnetic device configured to be activated in a docking mode of operation, and to be inactivated in a non-docking mode of operation.

According to some aspects, the docking interface 210 comprises an extendable member arranged to be received by the alignment device 110, and to be releasably locked in position during a docking mode of operation.

According to some aspects, the alignment actuator 220 comprises a first member 250 arranged to mechanically interface with a first alignment interface 420 of the alignment device 110, wherein the first alignment interface 420, upon actuation, is arranged to control alignment of the directive antenna 101 in a first direction 112.

According to some aspects, the alignment actuator 220 comprises a second member 251 arranged to mechanically interface with a second alignment interface 421 of the alignment device 110, wherein the second alignment interface 421, upon actuation, is arranged to control alignment of the directive antenna 101 in a second direction 111 different from the first direction 112.

According to some aspects, each member 250, 251 is connected to a respective motor 260, 261 that is adapted to rotate a corresponding member 250, 251 when mechanically interfaced with a corresponding alignment interface 420, 421.

According to some aspects, each alignment interface 420, 421 is rotatable by means of a corresponding mechanically interfaced member 250, 251, where rotation of each alignment interface 420, 421 controls alignment of the directive antenna 101 in a direction 112, 111.

According to some aspects, the control unit 230 is arranged to obtain an indicator signal configured to indicate a level of alignment of the first directive antenna 101 with respect to the second antenna 102, and to generate the control signal based on the indicator signal.

According to some aspects, the indicator signal comprises a received signal strength indication, RSSI, value.

According to some aspects, the indicator signal is an external control signal obtained from a remote source.

According to some aspects, the control unit 230 comprises a communications module 280 configured to establish communication with a radio device 114 associated with the first directive antenna 101.

According to some aspects, the control unit 230 comprises a communications module 280 configured to establish communication with a remote operator of the aerial vehicle 200.

According to some aspects, the second antenna 102 is a directive antenna, wherein the control unit 230 comprises a communications module configured to establish communication with a further un-manned aerial vehicle arranged to align the second directive antenna 102 in a direction D2 towards the first directive antenna 101.

According to some aspects, the aerial vehicle 200 comprises a camera unit 290 arranged to capture one or more images, wherein the control unit 230 comprises a communications module configured to transmit the one or more images to a remote transceiver 240.

Generally, the present disclosure relates to a method for aligning a first directive antenna 101 in a direction D1 towards a second antenna 102, the method comprising:

attaching S1 an un-manned aerial vehicle 200 to a first alignment device 110 of the first directive antenna 101;

mechanically interfacing S2 an alignment actuator 220, used in the aerial vehicle 200, with the alignment device 110;

generating S3 an alignment control signal; and actuating alignment S4 of the first directive antenna 101 based on the alignment control signal.

According to some aspects, the alignment actuator 220 uses a first member 250 for mechanically interfacing with a first alignment interface 420 of the alignment device 110, wherein the first alignment interface 420, upon actuation, is used for controlling alignment of the directive antenna 101 in a first direction.

According to some aspects, the alignment actuator 220 uses a second member 251 for mechanically interfacing with a second alignment interface 421 of the alignment device 110, wherein the second alignment interface, upon actuation, is used for controlling alignment of the directive antenna 101 in a second direction different from the first direction.

According to some aspects, each alignment interface 420, 421 is rotatable by means of a corresponding mechanically interfaced member 250, 251, where rotation of each alignment interface 420, 421 controls alignment of the directive antenna 101 in a direction.

According to some aspects, the method comprises:

obtaining S31 an indicator signal configured to indicate a level of alignment of the first directive antenna 101 with respect to the second antenna 102, and generating S32 the control signal based on the indicator signal.

According to some aspects, the indicator signal comprises a received signal strength indication, RSSI, value.

Generally, the present disclosure relates to a wireless device 240 that is adapted to communicate with an aerial vehicle 200 according to the above, wherein the wireless device 240 comprises a user interface 241 that is adapted of at least one of control of the movements of the aerial vehicle 200 and reception and display of data from the aerial vehicle 200.

According to some aspects, said data comprises at least one of a received signal strength indication, RSSI, value and camera images.

Generally, the present disclosure relates to a communication system comprising system comprising a plurality of wireless devices 240 according to the above.

Generally, the present disclosure relates to a computer program 802 for aligning a first directive antenna 101 in a direction D1 towards a second antenna 102, the computer program comprising computer code which, when run on processing circuitry 902 of a network node 901, causes the network node 101 to:

attach an un-manned aerial vehicle 200 to a first alignment device 110 of the first directive antenna 101;

mechanically interface an alignment actuator 220, used in the aerial vehicle 200, with the alignment device 110, generate an alignment control signal, and actuate alignment of the first directive antenna 101 based on the alignment control signal.

Generally, the present disclosure relates to a computer program product 801 comprising a computer program 802 according to the above for aligning a first directive antenna 101 in a direction D1 towards a second antenna 102, where the computer program 802 comprises computer code stored on a computer readable storage medium 803.

The invention claimed is:

1. An unmanned aerial vehicle for aligning a first directive antenna in a direction towards a second antenna, the unmanned aerial vehicle comprising:
    a docking interface configured to attach the aerial vehicle to a first alignment device of the first directive antenna;
    an alignment actuator configured to mechanically interface with the first alignment device and to actuate alignment of the first directive antenna based on an alignment control signal; and
    control circuitry configured to generate the alignment control signal.

2. The aerial vehicle of claim 1:
    wherein the aerial vehicle is a remote controlled unmanned aerial vehicle;
    wherein the control circuitry comprises a communications module arranged to receive control commands from a remote transceiver.

3. The aerial vehicle of claim 1:
    wherein the aerial vehicle is configured at least in part for autonomous operation;
    wherein the control circuitry is configured to autonomously generate control commands for controlling the aerial vehicle.

4. The aerial vehicle of claim 1, wherein the docking interface is configured to attach to the aerial vehicle in a docking mode of operation and release the aerial vehicle in a non-docking mode of operation.

5. The aerial vehicle of claim 1, wherein the docking interface comprises a controllable magnetic device configured to be:
    activated in a docking mode of operation wherein the unmanned aerial vehicle is attached to the first alignment device; and
    inactivated in a non-docking mode of operation, wherein the unmanned aerial vehicle is detached from the first alignment device.

6. The aerial vehicle of claim 1, wherein the docking interface is configured to extend to be received by the first alignment device, and to be releasably locked in position during a docking mode of operation.

7. The aerial vehicle of claim 1:
    wherein the alignment actuator comprises a first member configured to mechanically interface with a first alignment interface of the first alignment device;
    wherein the first alignment interface is configured to, upon actuation, control alignment of the directive antenna in a first direction.

8. The aerial vehicle of claim 7:
    wherein the alignment actuator comprises a second member configured to mechanically interface with a second alignment interface of the first alignment device;
    wherein the second alignment interface is configured, upon actuation, to control alignment of the directive antenna in a second direction different from the first direction.

9. The aerial vehicle of claim 8, wherein the first and second members are connected to a respective motor that is adapted to rotate the corresponding member when mechanically interfaced with a corresponding alignment interface.

10. The aerial vehicle of claim 8, wherein the first and second alignment interfaces are rotatable by means of a corresponding mechanically interfaced member, where rotation of each alignment interface controls alignment of the directive antenna in a direction.

11. The aerial vehicle of claim 1, wherein the control circuitry is configured to:
    obtain an indicator signal that indicates a level of alignment of the first directive antenna with respect to the second antenna; and
    generate the control signal based on the indicator signal.

12. The aerial vehicle of claim 1, wherein the control circuitry comprises a communications module configured to establish communication with a radio device associated with the first directive antenna.

13. The aerial vehicle of claim 1, wherein the control circuitry comprises a communications module configured to establish communication with a remote operator of the aerial vehicle.

14. The aerial vehicle of claim 1:
    wherein the second antenna is a second directive antenna;
    wherein the control circuitry comprises a communications module configured to establish communication with a further unmanned aerial vehicle configured to align the second directive antenna in a direction towards the first directive antenna.

15. The aerial vehicle of claim 1:
    further comprising a camera configured to capture one or more images;
    wherein the control circuitry comprises a communications module configured to transmit the one or more images to a remote transceiver.

16. A method for aligning a first directive antenna in a direction towards a second antenna, the method comprising:
    attaching an unmanned aerial vehicle to a first alignment device of the first directive antenna;
    mechanically interfacing an alignment actuator, used in the aerial vehicle, with the first alignment device;

generating an alignment control signal; and
actuating alignment of the first directive antenna based on the alignment control signal.

17. The method of claim 16:
wherein the alignment actuator uses a first member for mechanically interfacing with a first alignment interface of the first alignment device;
wherein the first alignment interface, upon actuation, is used for controlling alignment of the directive antenna in a first direction.

18. The method of claim 17:
wherein the alignment actuator uses a second member for mechanically interfacing with a second alignment interface of the first alignment device;
wherein the second alignment interface, upon actuation, is used for controlling alignment of the directive antenna in a second direction different from the first direction.

19. The method of claim 18, wherein the first and second alignment interfaces are rotatable by means of a corresponding mechanically interfaced member, where rotation of each alignment interface controls alignment of the directive antenna in a direction.

20. The method of claim 16, further comprising:
obtaining an indicator signal indicating a level of alignment of the first directive antenna with respect to the second antenna; and
generating the control signal based on the indicator signal.

* * * * *